US012257847B2

(12) United States Patent
Roginski et al.

(10) Patent No.: US 12,257,847 B2
(45) Date of Patent: Mar. 25, 2025

(54) PRINT HEAD ASSEMBLY WITH DYNAMIC SHIFTING CIRCUIT BOARD

(71) Applicant: Norwix, Inc., Norwich, CT (US)

(72) Inventors: Zbigniew Roginski, Rocky Hill, CT (US); Jayme LaRosa, Colchester, CT (US)

(73) Assignee: Norwix, Inc., Norwich, CT (US)

( * ) Notice: Subject to any disclaimer, the term of this patent is extended or adjusted under 35 U.S.C. 154(b) by 126 days.

(21) Appl. No.: 17/901,968

(22) Filed: Sep. 2, 2022

(65) Prior Publication Data

US 2023/0115348 A1 Apr. 13, 2023

Related U.S. Application Data

(60) Provisional application No. 63/247,907, filed on Sep. 24, 2021.

(51) Int. Cl.
*B41J 2/175* (2006.01)

(52) U.S. Cl.
CPC ......... *B41J 2/17546* (2013.01); *B41J 2/1752* (2013.01); *B41J 2/1753* (2013.01)

(58) Field of Classification Search
CPC ..... B41J 2/17546; B41J 2/1752; B41J 2/1753
See application file for complete search history.

(56) References Cited

U.S. PATENT DOCUMENTS 10,518,545 B2 * 12/2019 Ono .................... B41J 2/17513

* cited by examiner

*Primary Examiner* — Geoffrey S Mruk
(74) *Attorney, Agent, or Firm* — Alix, Yale & Ristas, LLP

(57) ABSTRACT

A print head assembly includes a dynamically shifting circuit board. The circuit board is forced into a rear position toward a cavity for a print ink cartridge and is allowed to move forward away from the cavity for removal of the cartridge, which allows vertical removal and installation rather than requiring angular shifting. The circuit board may be biased in the forward direction away from the cavity and held in place by a plate. The plate is movable between two positions which respectively move the circuit board to the rear position against the bias and allow the circuit boar to move to the forward position via the bias force.

20 Claims, 19 Drawing Sheets

PRINT HEAD ASSEMBLY WITH DYNAMIC SHIFTING CIRCUIT BOARD

CROSS-REFERENCE TO RELATED APPLICATION

This application claims priority to U.S. Provisional Patent Application No. 63/247,907 for Print Head Assembly With Dynamic Shifting Circuit Board, filed Sep. 24, 2021, the entire content of which is hereby incorporated by reference.

BACKGROUND

The disclosed embodiments relate to the field of printing, and more particularly to a print head assembly for use with ink cartridges.

Industrial printers are common instruments for printing in relatively high intensity settings like offices with many well-known prior art products and systems in existence. Such printers fall under a varieties of technologies, such as ink jet printing and laser printing, for example. The present disclosure concerns technology for primary use within industrial ink jet printers, however, may be applicable to printers for use in desktop and/or home settings.

Ink jet printers typically include one or more replaceable ink cartridges mounted within a cavity in communicative contact with a circuit board for communicating and initiating printing instructions. Single color printers may include a cavity for a single (black) cartridge whereas full color printers typically include a plurality cavities for receiving ink cartridges of various colors. Typically, when an ink cartridge is in an installed position, it is held tightly at an interface against the circuitry.

Such circuitry is delicate, and thus understandably, circuits are susceptible to damage via inadvertent contact during removal and installation of an ink cartridge or otherwise. For this reason, print head assemblies in known industrial printers are configured such that ink cartridges are installed at an angle and then shifted angularly into place closely contacting with the circuitry. Such systems necessarily require a larger cavity space and overall larger parts to accommodate the shifting action of the cartridges during installation and removal, which leads to a larger sized and cumbersome system overall. Even within systems that provide for angular installation of ink cartridges, circuit boards are vulnerable to damage from inadvertent contact.

It would thus be useful to provide an assembly and/or system that avoids the aforementioned drawbacks and damage risks, while allowing for a reduction in size of the product. Such an assembly would protect circuitry during installation and removal of cartridges and allow for vertical installation thus allowing for a lower profile design.

SUMMARY

Provided herein is a print head assembly with circuit board that dynamically shifts outward from the cartridge receipt cavity, which may be initiated upon opening the cover. Preferred embodiments of the inventive assembly are provided via cooperation between the circuit board and a front plate that has flat sections and relief dimples/ramps, sets of bias members separately acting upon the circuit board and front plate in different directions, and an interactive cam system. Other specific configurations and mechanisms for providing movement of the circuit board away from the cavity/cartridge are provided as well.

The assembly allows completely vertical removal and insertion of ink cartridges, rather than at an angle, while ensuring that the circuit board is protected throughout the process. This allows manufacture of smaller print heads and lower profile configurations.

In one embodiment, a print head assembly includes a housing, a cover and a circuit board. The housing defines an inner cavity configured for receipt and retention of a print ink cartridge. The cover operatively opens and closes an access opening in the housing that communicates with the cavity. The circuit board is movable and configured and positioned for communicating with a print ink cartridge installed within the cavity. Opening of the cover to an opened position initiates movement of the circuit board away from the cavity and disengagement from a print ink cartridge installed within the cavity. Closing of the cover to a closed position initiates movement of the circuit board toward the cavity and engagement with a print ink cartridge installed within the cavity.

In another embodiment, a print head assembly comprises a housing, a cover and a circuit board. The housing defines an inner cavity configured for receipt and retention of a print ink cartridge. The cover is configured to open and close an access opening in the housing that provides access to the inner cavity. The circuit board is positioned within the housing and is movable back-and-forth repeatedly between a first position toward the inner cavity and a second position away from the inner cavity.

In yet another embodiment, a print head assembly includes a housing, a cover, a circuit board shield and a plate. The housing defines an inner cavity configured for receipt and retention of a print ink cartridge. The cover operatively opens and closes an access opening in the housing that communicates with the cavity. The circuit board is positioned forward of the cavity and configured for communicative contact with a print ink cartridge installed within the cavity. The circuit board shield is positioned forward of the cavity and defines a shield opening, and the plate is positioned forward of the circuit board. The plate is operatively connected to the cover whereby when the cover is in a closed position closing the access opening, the plate forces the circuit board into the shield opening. When the cover is in an opened position allowing access to the access opening, the plate allows the circuit board to move forward withdrawing from the shield opening such that the shield is positioned between the cavity and the circuit board.

DETAILED DESCRIPTION

Among the benefits and improvements disclosed herein, other objects and advantages of the disclosed embodiments will become apparent from the following wherein like numerals represent like parts throughout the figures. Detailed embodiments of a print head assembly with dynamic shifting circuit board, are disclosed; however, it is to be understood that the disclosed embodiments are merely illustrative of the invention that may be embodied in various forms. In addition, each of the examples given in connection with the various embodiments of the invention are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), although it may. The phrases "in another embodiment" and "in some other embodiments" as used herein do not necessarily refer to a different embodiment, although it may. Thus, as described below, various embodiments may be readily combined without departing from the scope or spirit of the invention.

In addition, as used herein, the term "or" is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

Figure 1:
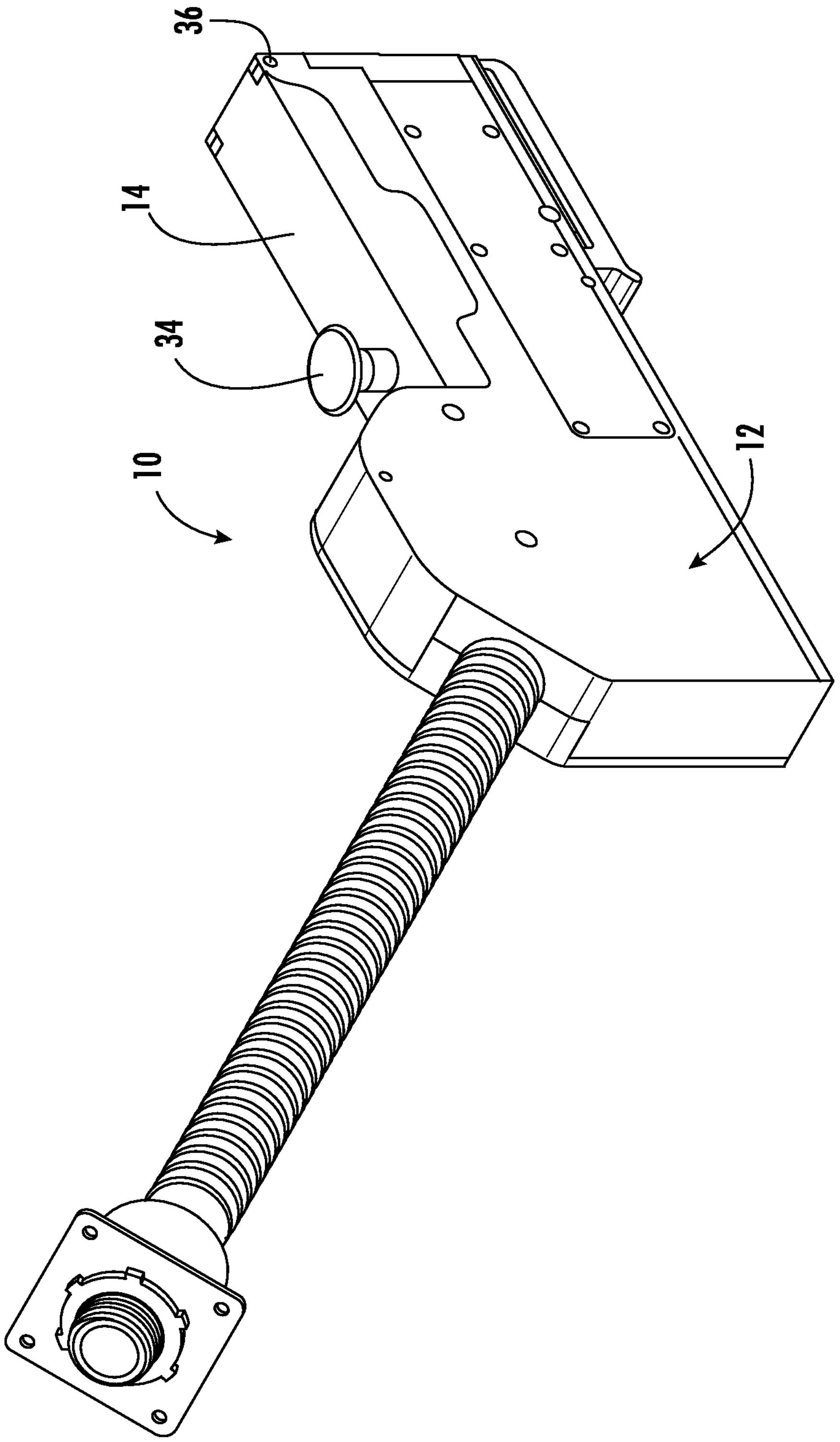
FIG. 1 is a perspective view of an embodiment of the disclosed print head assembly.

FIG. 1 shows a first embodiment of the inventive print head assembly 10, including most generally an enclosure 12 with a cover 14. The cover is configured to be opened and closed to access an inner portion of the enclosure. In the depicted embodiment, the cover 14 is engaged to the housing 12 in a pivotal relationship, however, this is a non-limiting relationship. Other embodiments exist wherein the cover is removable, slidable or otherwise adjustable to open and close. The housing 12 defines an inner cartridge receiving cavity and includes or houses various mechanical and electrical sub-elements configured to permit standard use of the print head assembly 10 in a printer as known in the printing arts.

Figure 3:
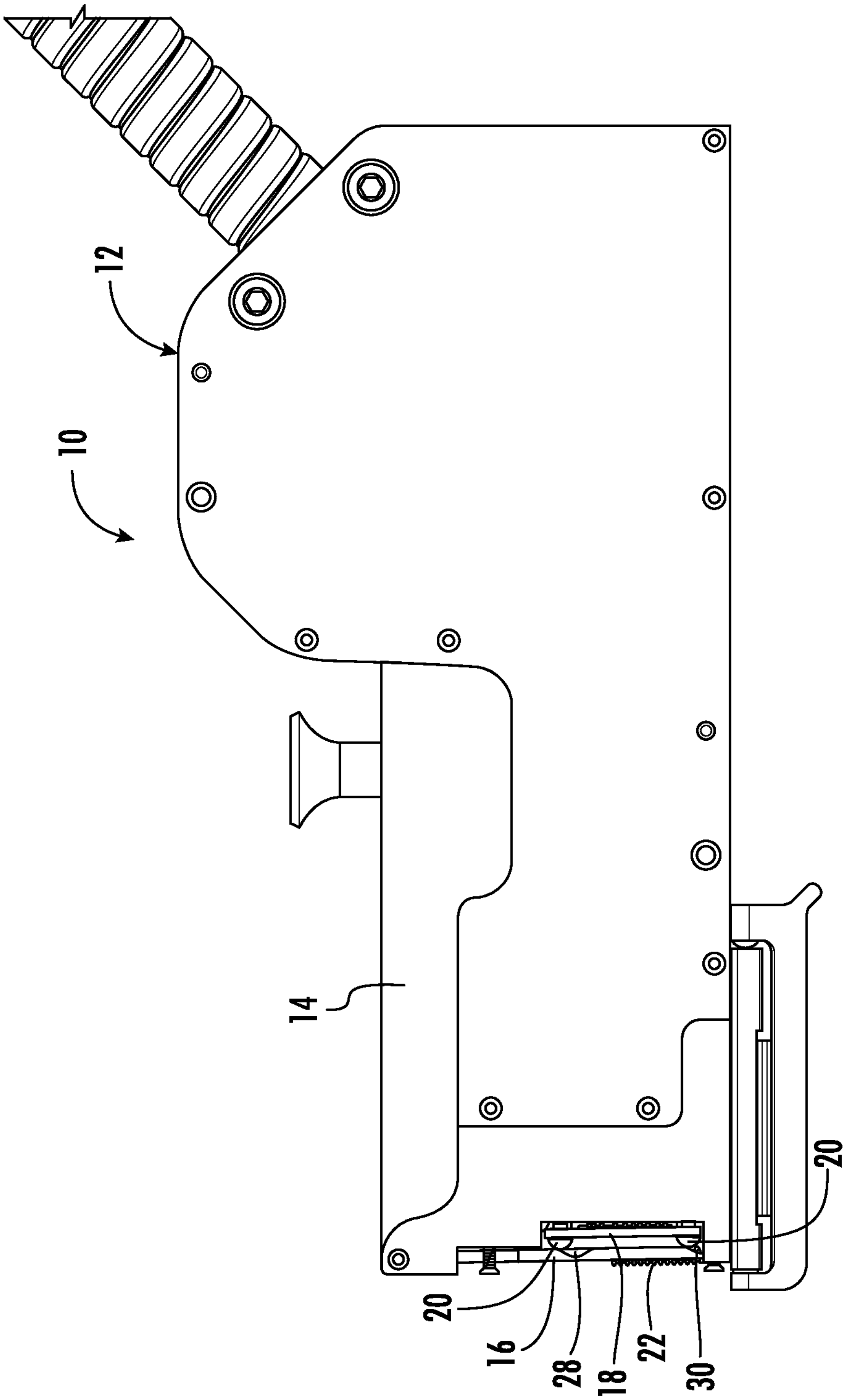
FIG. 3 is a side elevation view of the assembly in a closed position with portions of the enclosure hidden from view to show the operative engagement between the circuit board and front plate.
Figure 4:
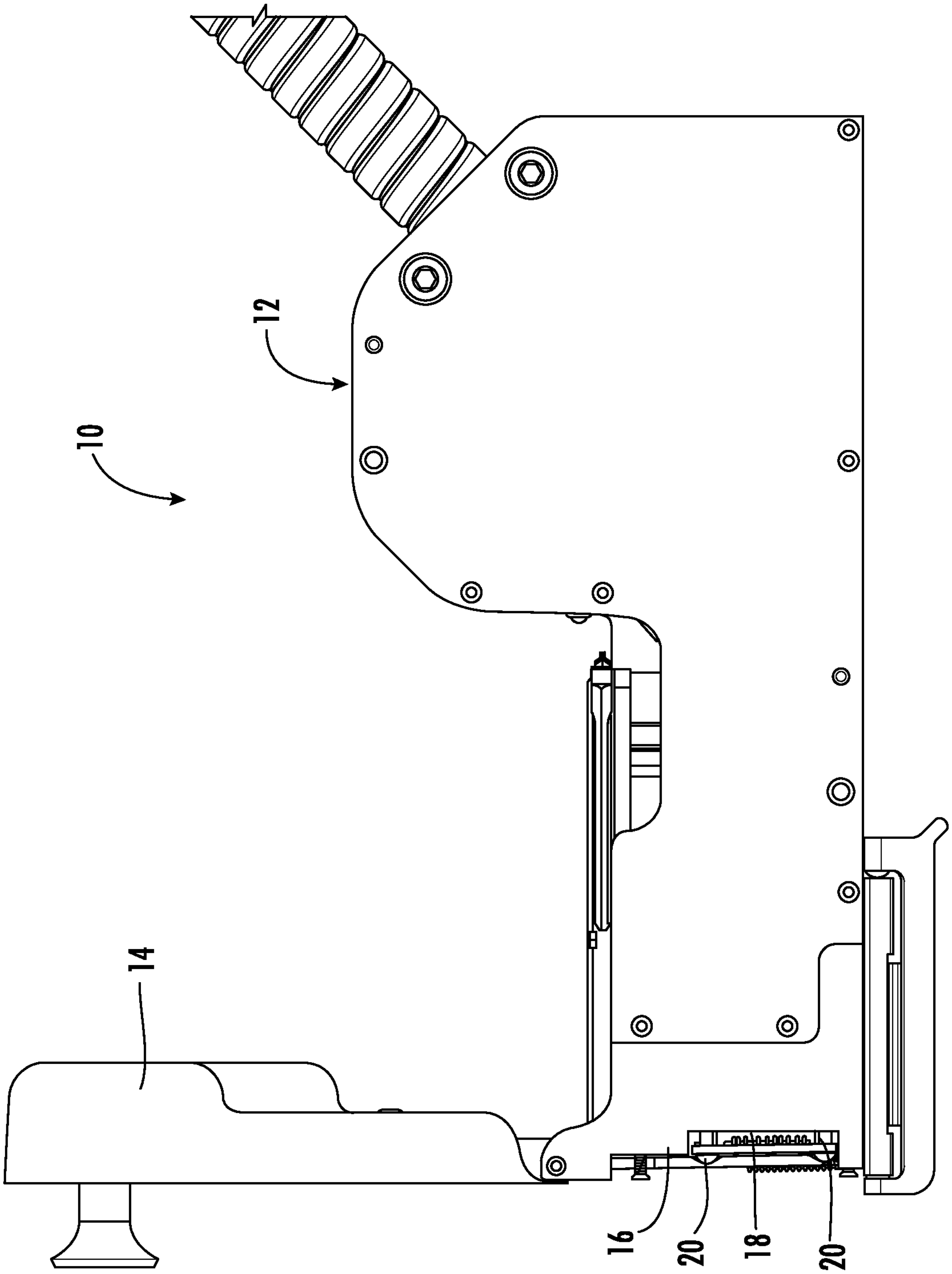
FIG. 4 is a side elevation view of the assembly of FIG. 3 in an opened position with circuit board retracted from the cartridge receipt cavity.

As can be seen and readily understood by those skilled in the art, the depicted embodiment of the assembly 10 is a single-piece Penstall design for use with Hewlett-Packard branded ink cartridges and printers. However, the inventive elements, relationships and concepts disclosed herein are not necessarily limited to this specific implementation. While the print head assembly is in operation, an internally mounted circuit board 18 is in communicative contact with electrical elements on a front surface of an installed ink cartridge 100 (front surface of cartridge and electrical elements thereon are not shown). As used herein, "front" refers to the general side on the left in FIGS. 1 and 3, "rear" refers to the general side on the right of FIGS. 1 and 3; however, these terms are relative, non-limiting and used solely for descriptive purposes. As within other comparable print head assemblies, the cover 14 is engaged with a housing or enclosure 12 in a pivotal relationship and is used to open and close a cartridge receipt cavity defined within the enclosure, primarily to allow access to users to install and replace ink cartridges 100.

However, as discussed in the background section, removing and replacing cartridges has typically always required an angled removal and insertion of the cartridge and shifting into operative position relative to the valves and electrical connections. That is, an ink cartridge cannot be inserted straight downward into position due to the positioning of the circuit board. A circuit board is always in close proximity and/or contact to the ink cartridge during use. A cartridge should never be inserted in a manner with contact between the circuit board and cartridge since such contact while moving would cause scraping and damage to the elements on each. Since ink cartridges must be inserted at an angle, cavities in prior art systems must be extensive in the front/rear direction to accommodate such movement. This necessarily results in a larger sized housing.

Figure 2:
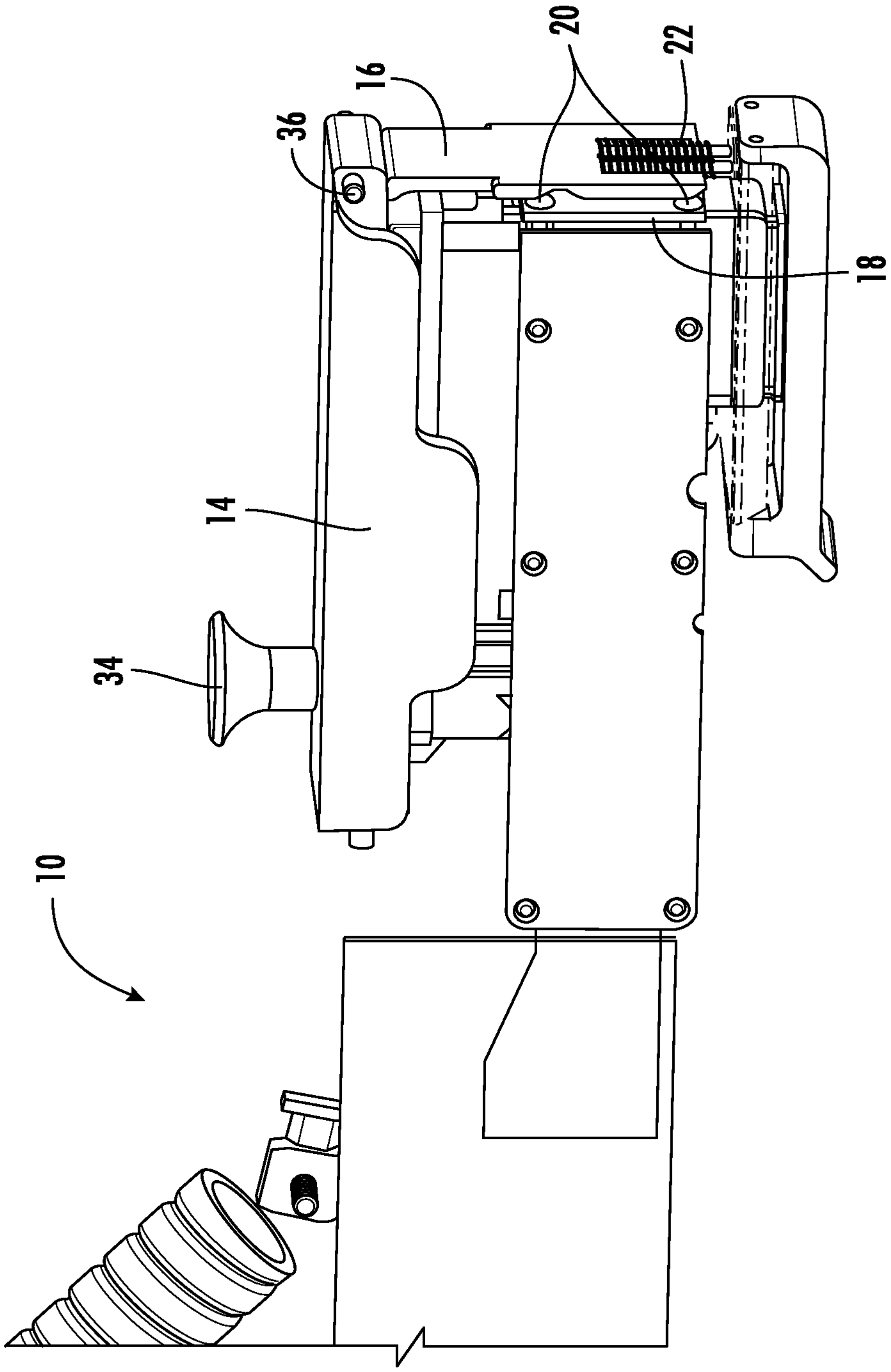
FIG. 2 is a front perspective of the assembly of FIG. 1 with portions of the enclosure hidden from view.
Figure 9:
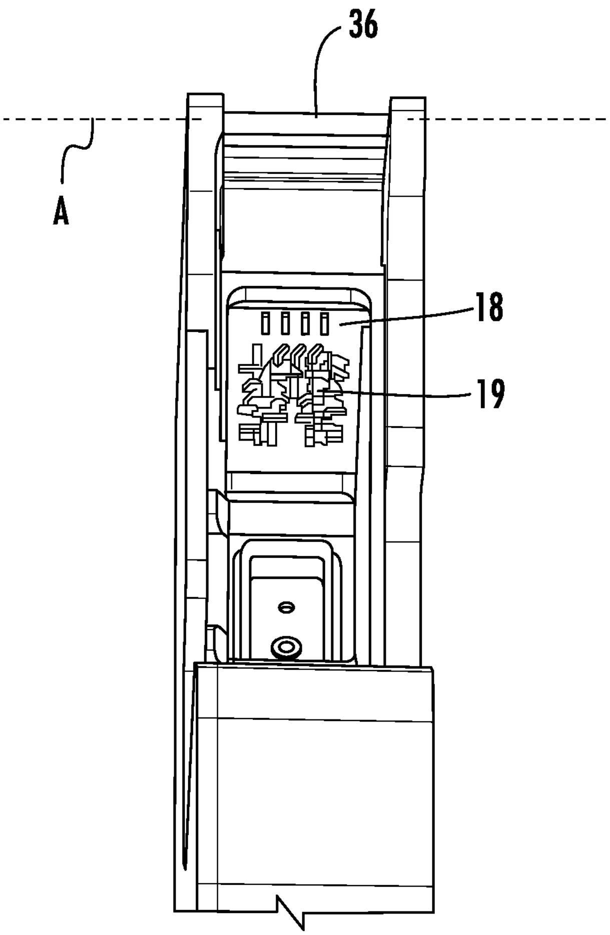
FIG. 9 is a top view of the assembly with cover and cartridge removed.
Figure 13:
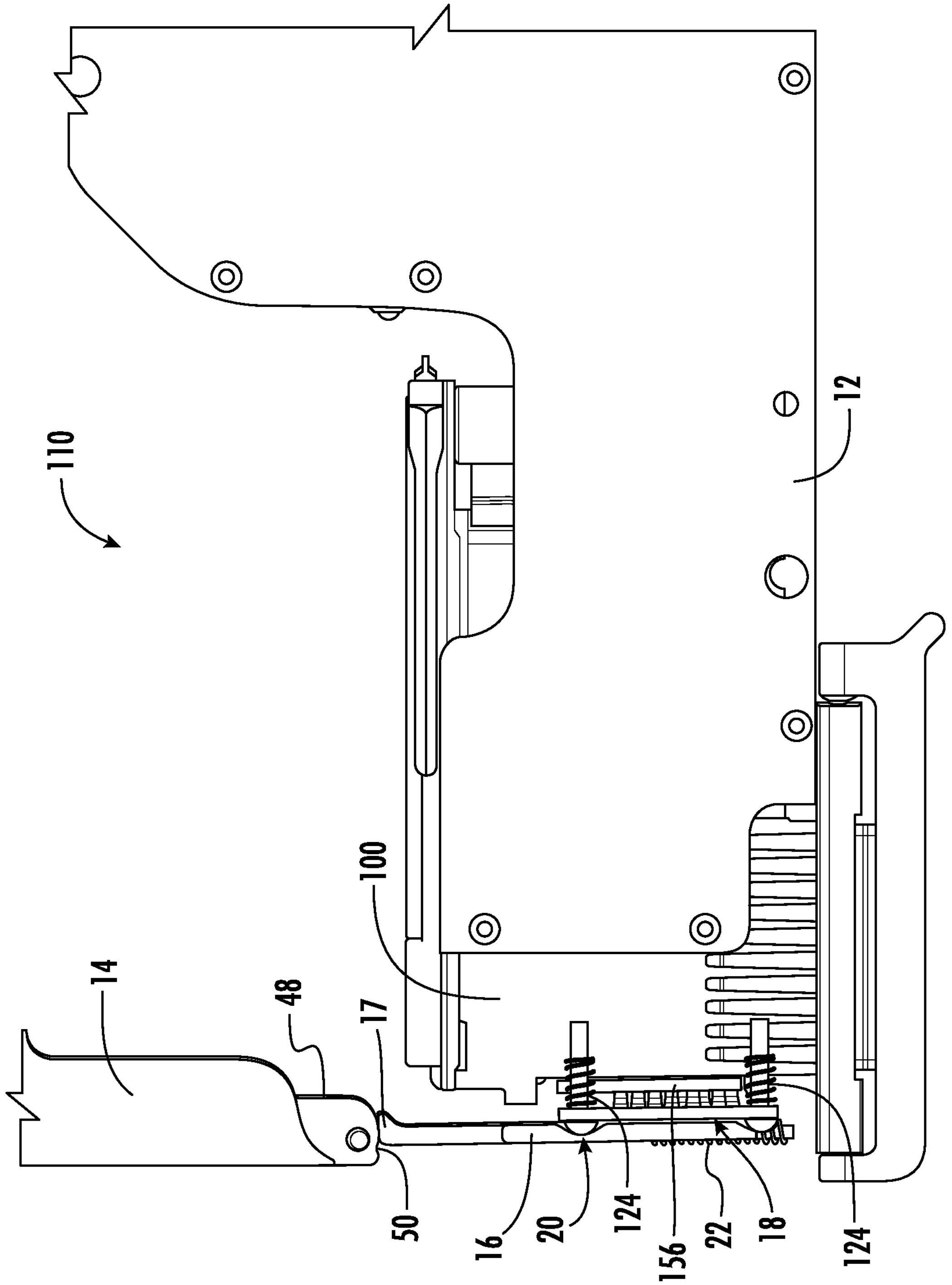
FIG. 13 is a side elevation view of another embodiment of the disclosed print head assembly in the opened position with certain elements removed from view.
Figure 14:
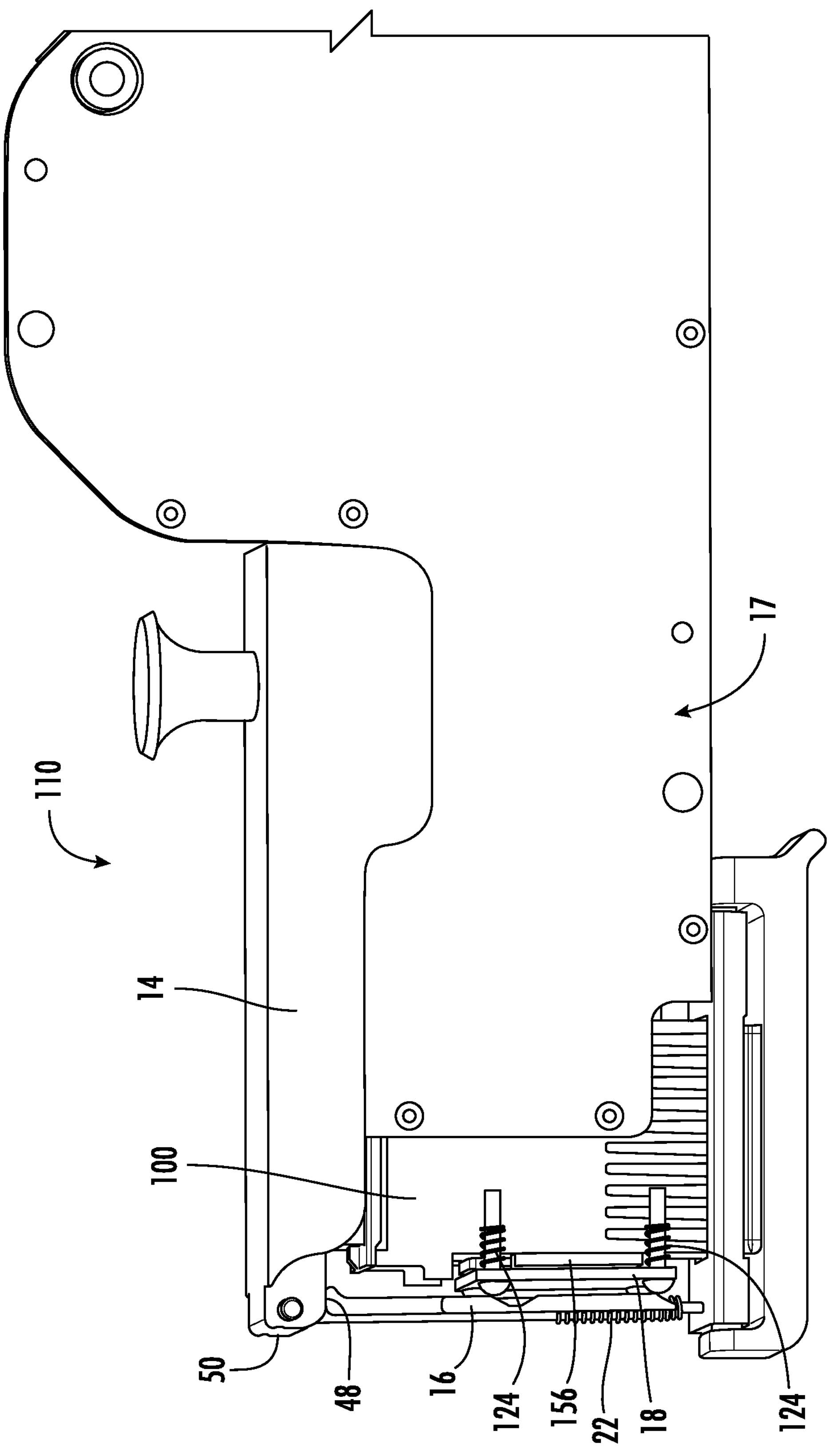
FIG. 14 is a side elevation view of the embodiment of FIG. 13 in the closed position.

The disclosed assembly 10 initiates disengagement of the circuit board 18 from the cartridge 100 and withdrawal of the circuit board from the cartridge receipt cavity, and thus provides clearance to remove and insert a cartridge entirely vertically. In this embodiment, this is accomplished via a cooperative engagement between a front plate 16 and the circuit board 18, a set of bias members providing a directional bias on each of the front plate and circuit board and a cam system. More specifically, in the preferred embodiment, the bias members are one or more compressed compression springs, 22 and 24, respectively, that are positioned substantially perpendicular to one another. Here, with reference to cross-sectional views in FIGS. 9 and 10, one set of bias members 24 provide a biasing force on the circuit board 18 in a laterally forward direction (right to left in the views of FIGS. 9 and 10). With reference primarily to FIGS. 2 and 13, another set of bias members 22 provides a biasing force on the front plate 16 in a longitudinal direction perpendicular to the lateral direction (upwards in the views of FIGS. 2 and 13). Notably, one of the longitudinal bias members 22 is visible, but partially concealed by the front plate 16, in the other side views presented herein. More specifically, it can be said that, in this preferred embodiment, the circuit board 18 is biased forwardly toward the front plate 16 and the front plate is biased upward. Those skilled in the art would recognize that these exact forward/upward directional configurations are intended to be relative and/or approximate, and are thus non-limiting to the inventive concepts.

With reference to FIGS. 2, 3, 5, 7 and 9, for example, which show the assembly in its closed position, the front plate 16 is in abutment with fastener heads 20 that are engaged with the circuit board 18 to hold the circuit board in position relative to and within the enclosure 12. The circuit board is biased in the direction against the front plate 16 by the bias members 24, as discussed above. As can be seen, in the depicted preferred embodiment, the bias is provided by one or more compressed helical springs 24 positioned within the enclosure 12 operatively engaged with the circuit board 18. More specifically, in the depicted embodiment, a compression spring is positioned extending laterally and received within a hollow bore defined within the stem 21 of each fastener 20 that extends through the board 18 in a rigid engagement. In other embodiments, such as that shown in FIGS. 16-21, lateral compression springs 124 are positioned to the outside of fasteners 120 with the stem 121 thereof extending through the axis of the respective spring. Those skilled in the art will readily understand that the specific configuration and relationships of the compressed springs 24/124 and fasteners 20/120 are non-limiting and the lateral (outward/forward) bias force on the circuit board 18 may be provided in numerous other manners or by different types of bias members, such as torsion springs, compressed resilient material like rubber pads, or an extended torsion spring acting on the opposite end.

Figure 10:
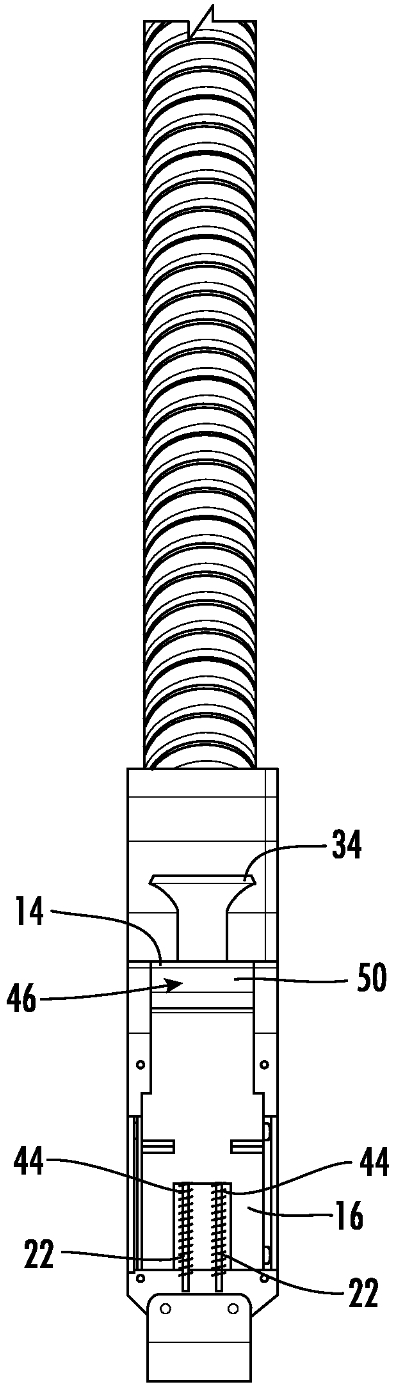
FIG. 10 is a front elevation view with the enclosure removed showing details of the front plate.
Figure 19:
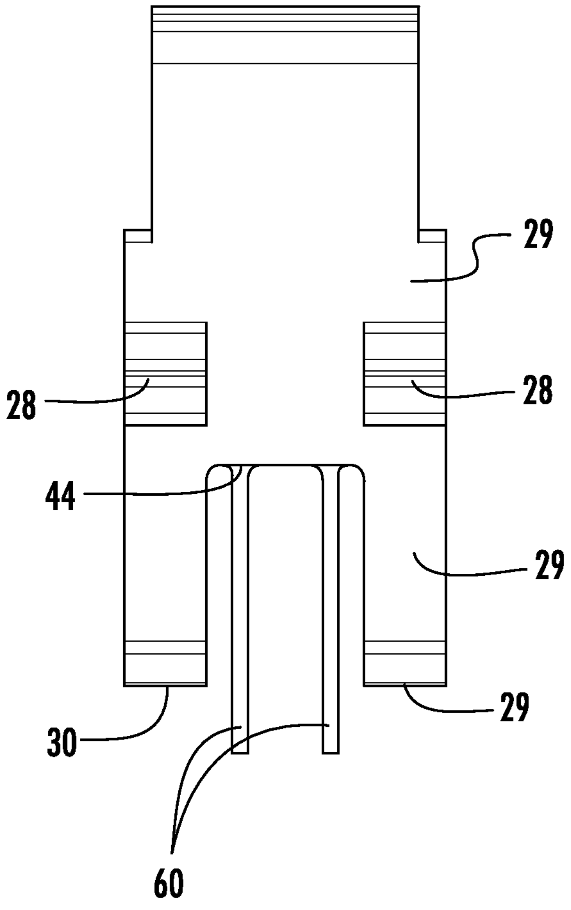
FIG. 19 is an elevation view of a front plate employed within the disclosed embodiments of the print head assembly.

As shown most clearly in FIG. 10 with further reference to the isolated view of the plate 16 in FIG. 19, the front plate 16 is under a longitudinal (upward) bias provided by a pair of vertically arranged springs 22 compressed between a bottom surface of the enclosure 12 and an upper shoulder 44 in an intermediate section of the front plate 16. Additionally, as shown clearly in FIGS. 7, 8 and 19, the front plate 16 has an inner surface facing the circuit board 18 that defines a relief dimple 28 and/or a ramp section 30, with each such dimple or ramp section associated with the rounded head of a circuit board fastener 20.

Figure 11:
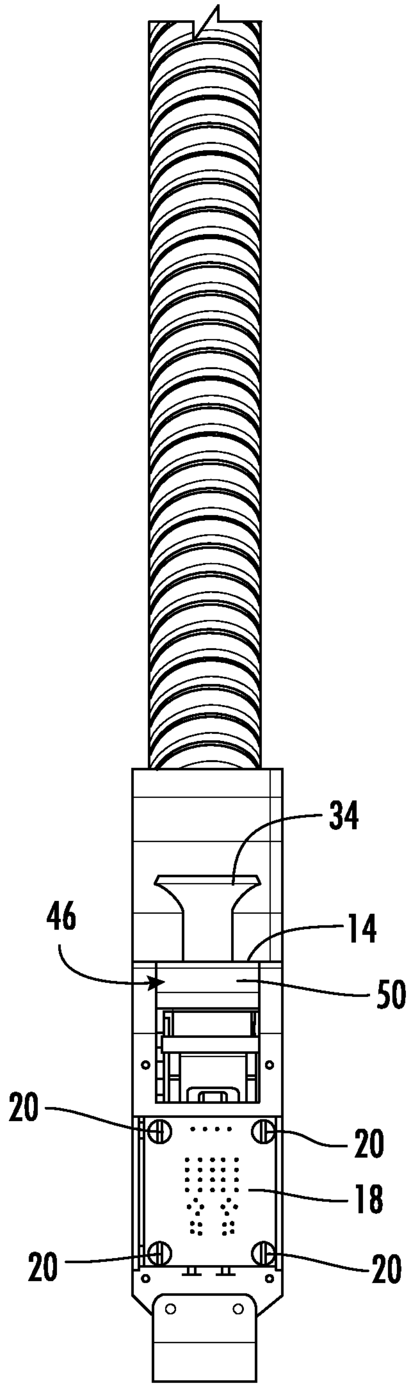
FIG. 11 is a front elevation view with the front plate removed showing details of the circuit board.
Figure 12:
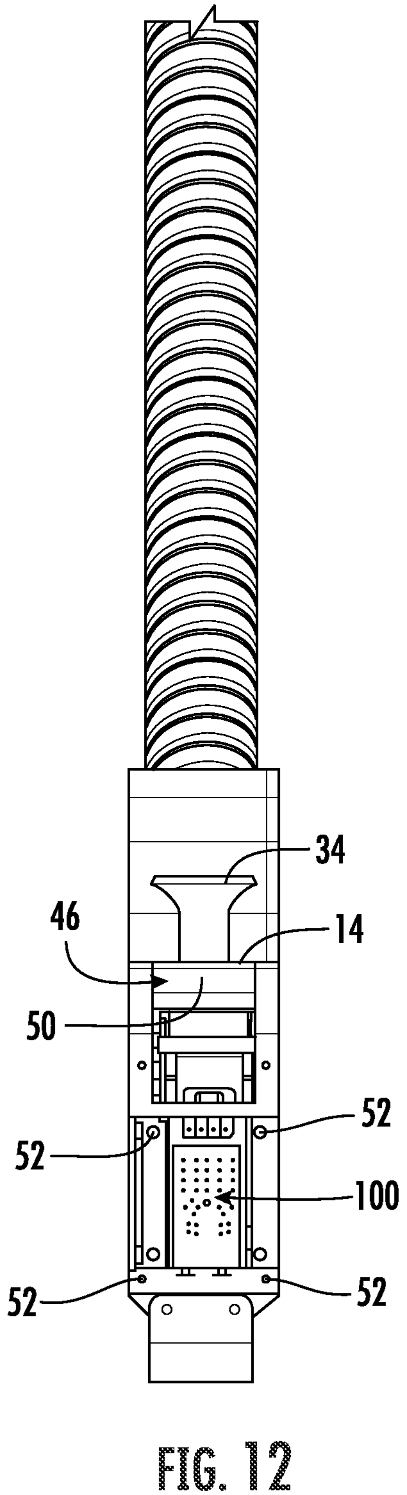
FIG. 12 is a front view with the circuit board removed.

As shown in FIG. 11, this embodiment utilizes a total of four fasteners 20 rigidly connected to the circuit board 18. Accordingly, as shown in FIG. 19, the front plate 16 includes two relief dimples 28 (each accommodating one of the upper fasteners) and two ramp sections 30 (each accommodating one of the lower fasteners). In another embodiment, the front plate comprises a single elongated dimple that extends across the plate to accommodate both upper fasteners 20. The front plate 16 may further include posts 60 at an intermediate position extending longitudinally downward from the shoulder 44. Within the assembly 10/110, each post is configured to receive one of the longitudinal springs 22 and provide alignment and stability thereof. As also shown in the detailed view of FIG. 19, the front plate 16 defines a flat surface portion 29 at least above each dimple 28 and ramp section 30. The flat surface portions 29 effect dynamic shifting of the circuit board 18 rearward/inward toward the cavity when the cover 14 is moved to the closed position, as will be discussed in detail below.

The front plate 16 also includes a top edge 17 that abuts a surface of the cover 14, as will be discussed further below. As depicted, the top edge of the front plate may include a rounded outer portion and a projecting section or nub to enhance surface area for abutment with the cam member 46 and improve mechanical stability and smoothness of operation.

Figure 5:
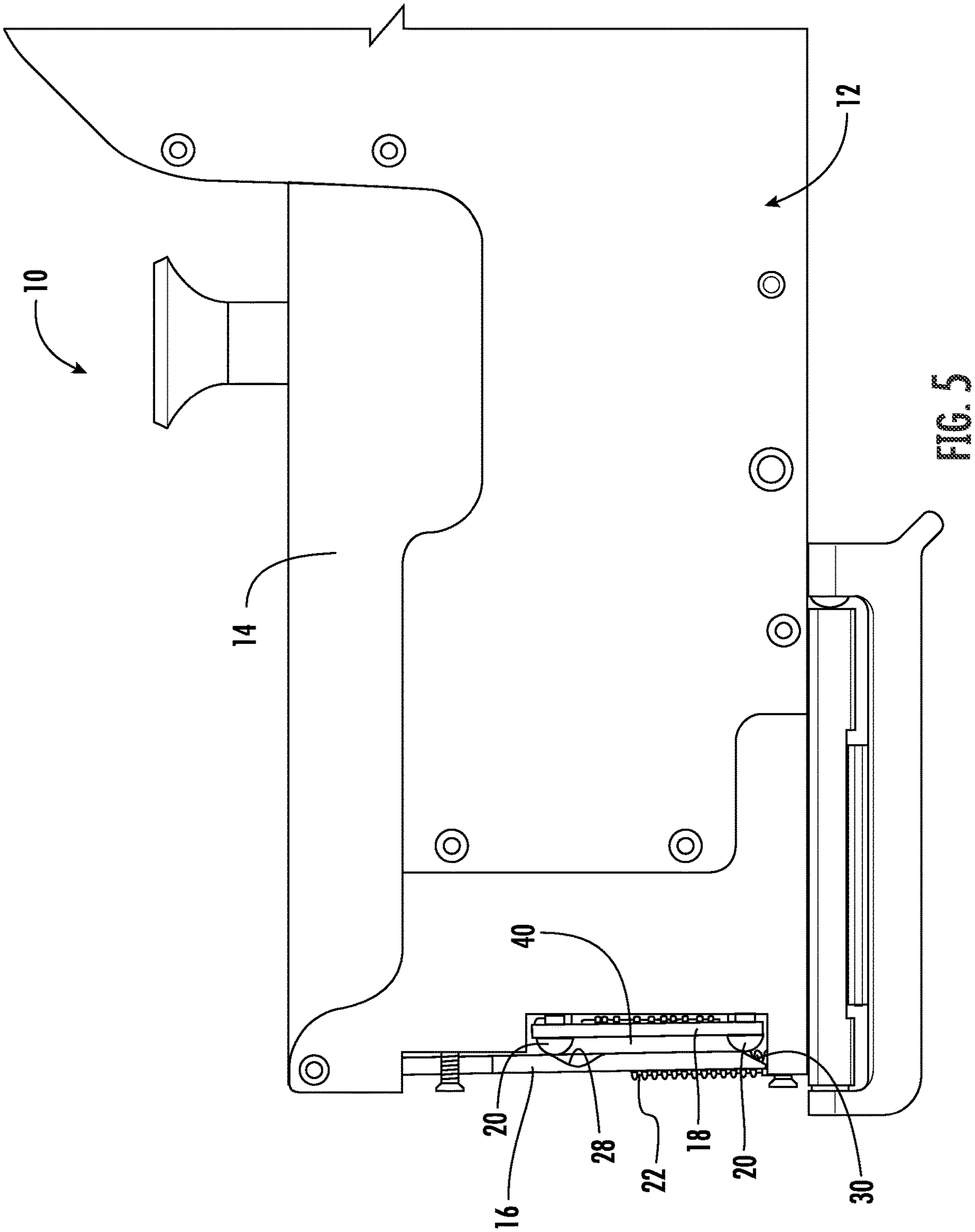
FIG. 5 is a side elevation view of FIG. 3 with a rear portion of the enclosure removed for clarity of the position of the back plate.
Figure 6:
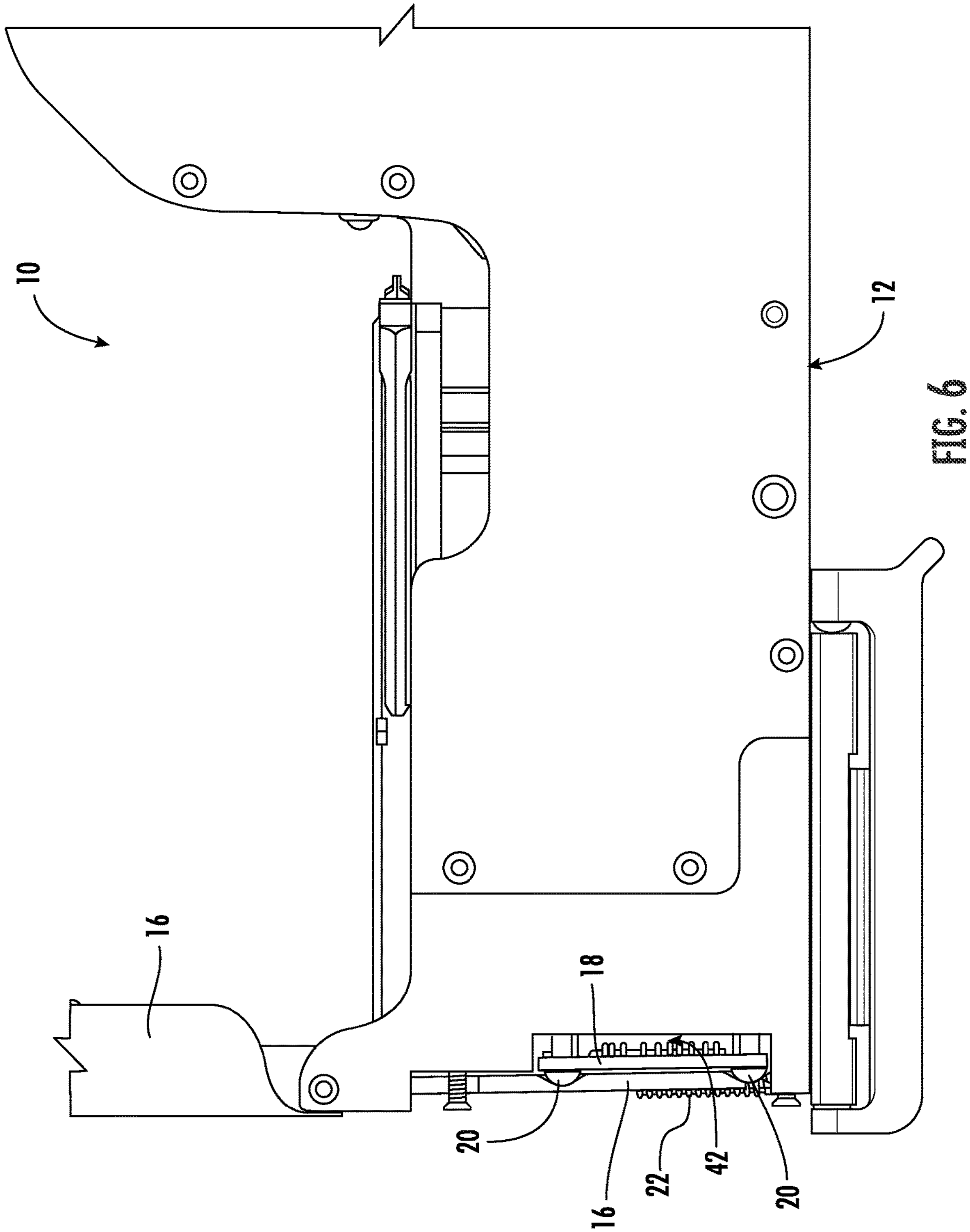
FIG. 6 shows the view of FIG. 5 in the opened position.
Figure 7:
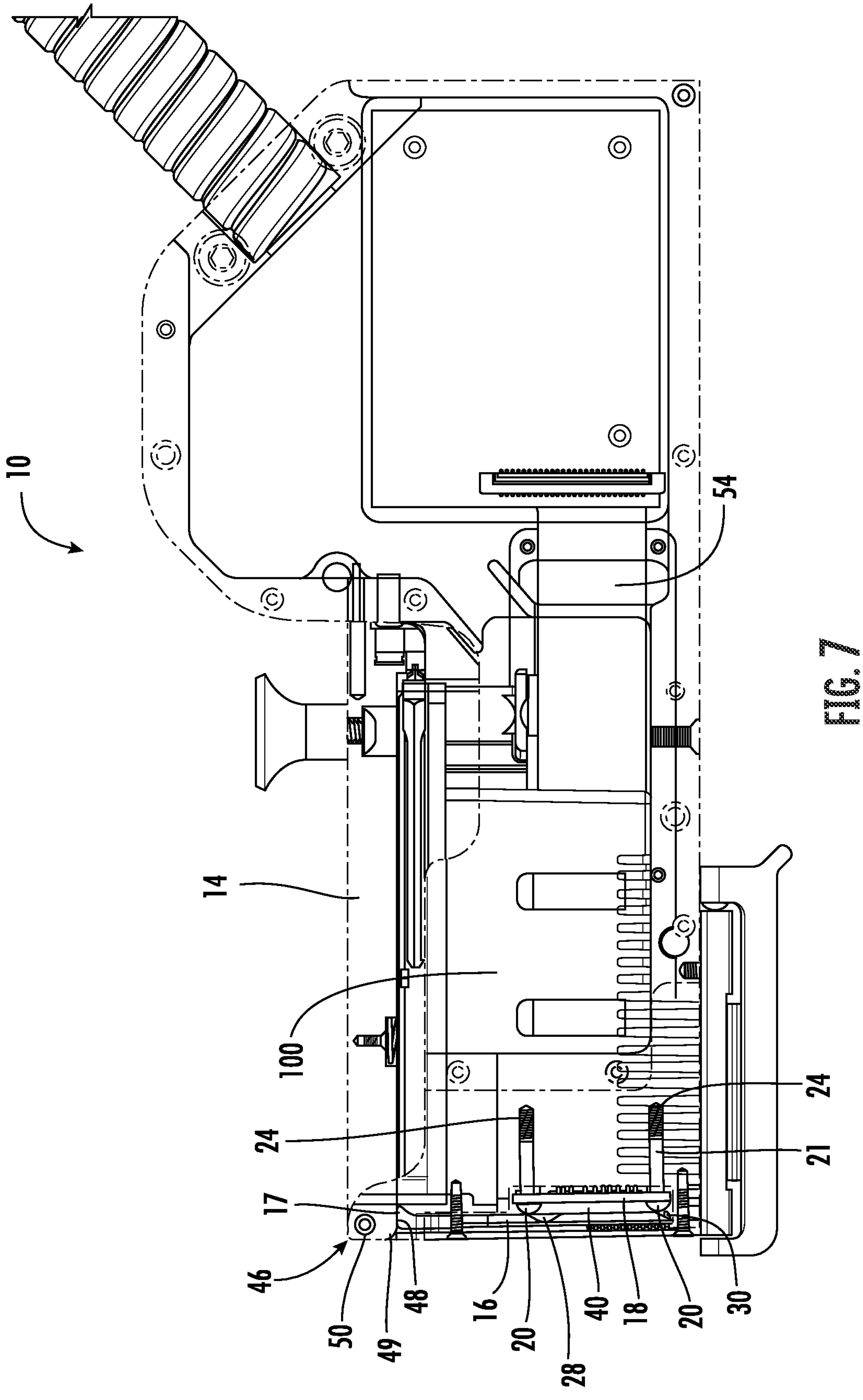
FIG. 7 is an enlarged view of the assembly in the closed position with circuit board pressed into a tightened position.
Figure 8:
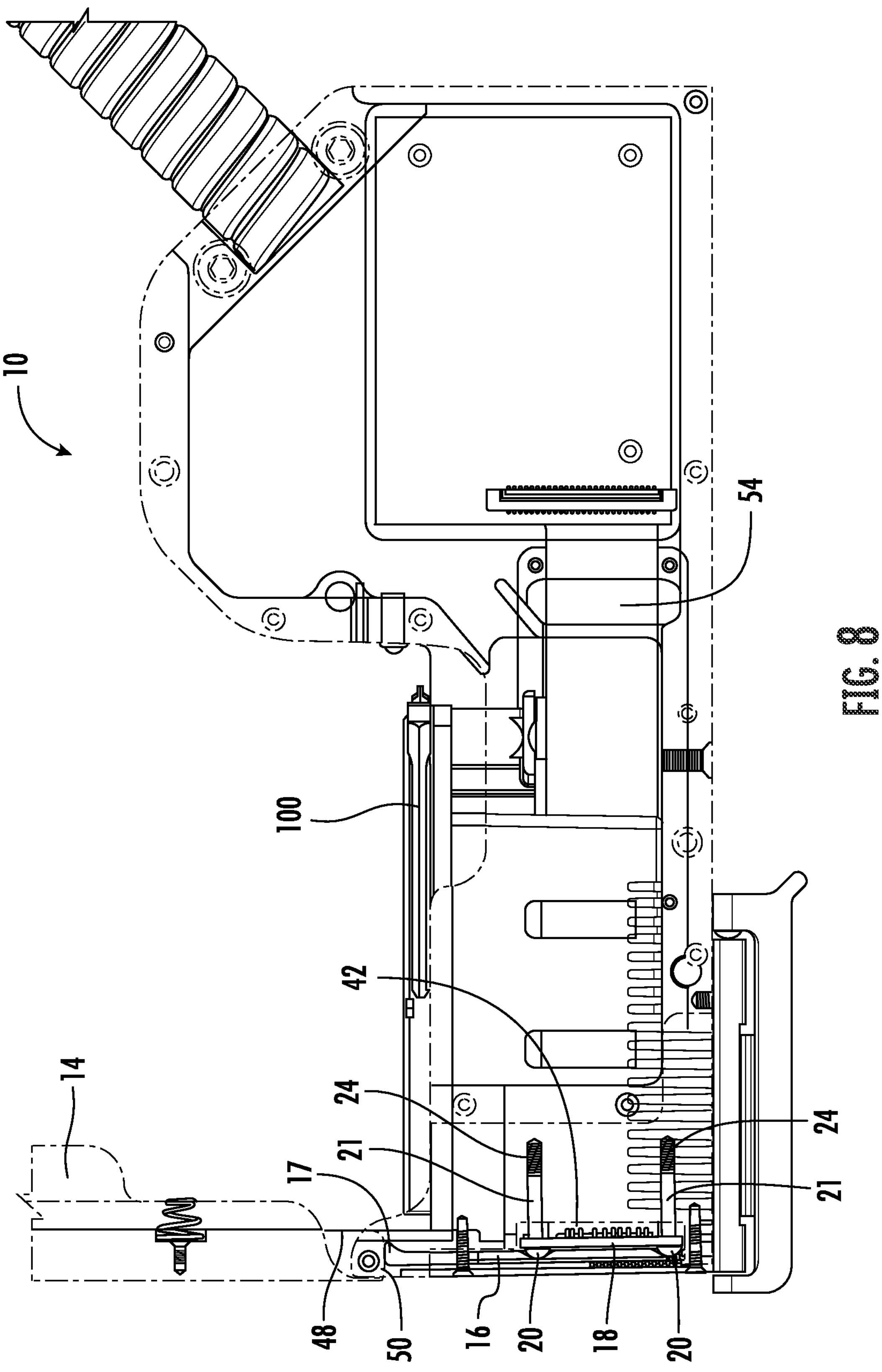
FIG. 8 is a view of FIG. 7 in the opened position with circuit board in the retracted position.

The cross-sectional views of FIGS. 7 and 8 best depict the cooperative cam system, and the enlarged views of FIGS. 5 and 6 best depict the cooperative relationship of the front plate 16 and circuit board 18 that combine to drive operation of the dynamically shifting circuit board. As shown, the cover 14 includes a cam member 46 within its rear section with a pivot pin 36 extending transversely therethrough and defining an axis of rotation of the cover. In the depicted preferred embodiment, the pivot pin 36 and axis extend substantially perpendicular to the vertical bias members 22 acting on the front plate 16 and to the lateral bias members 24 acting on the circuit board 18. In this manner, one can say that if the lateral springs 24 define an X-axis and the longitudinal springs 22 define a Y-axis, then the pivot pin 36 defines the Z-axis. The cam member 46 has an irregularly dimensioned outer surface formed from a bottom surface 48 and a front surface 50 with a rounded intermediate section 49 transitioning between them. As can be seen in FIGS. 7 and 8, the bottom surface 48 is positioned at a distance radially further from the pivot pin 36 than the front surface 50, and thus the bottom surface 48 acts as the nose and the front surface 50 acts as the heel of the cam.

When the cover 14 is closed (typically over an installed cartridge 100), the bottom surface 48 holds the front plate 16 down against the bias from the compression springs 22, defining a closed position of the assembly 10. In the closed position, the front plate 16 is vertically aligned with a flat portion 29 of its inner surface against the rounded surface of the circuit board fasteners 20, which thereby presses the circuit board 18 inwardly against the bias from the lateral compression springs 24. In this position, the circuit board 18 is retained within the enclosure in communicative contact with the cartridge 100 and there is an open gap 40 between the front plate 16 and circuit board 18. The key elements and relationships of the assembly in the closed position are best seen in FIG. 7.

When the cartridge receipt cavity of the housing 12 needs to be accessed, typically to remove and replace a cartridge, a user pivots the cover 14 from the closed position (FIG. 7) to an opened position (FIG. 8). In the opened position, the cam member 46 is shifted such that the front surface 50 is positioned against the top edge 17 of the front plate 16. Since the front surface 50 is closer to the pivot pin 36 than is the bottom surface 48, the opened position provides a degree of top clearance for the front plate 16, which thereby allows the front plate 16 to shift upward under the upward bias from the vertical springs 22. As the front plate 16 shifts upward, the relative longitudinal positioning of the front plate and circuit board 18 also shifts such that each of the rounded surfaces of the heads of the fasteners 20 is received within a relief dimple 28 or relief ramp 30 with the circuit board 18. In this manner, the circuit board 18 is dynamically shifted forward away from the cartridge receipt cavity under the bias of the lateral springs 24 each time the cover 14 is lifted/opened. As will be discussed below, an embodiment further includes a circuit board shield 156 that is fixed in place relative to the housing 12 and cavity defined therein through which at least the contact points of the circuit board withdraw, which provides additional protection against damage from withdrawing or inserting a cartridge.

Figure 15:
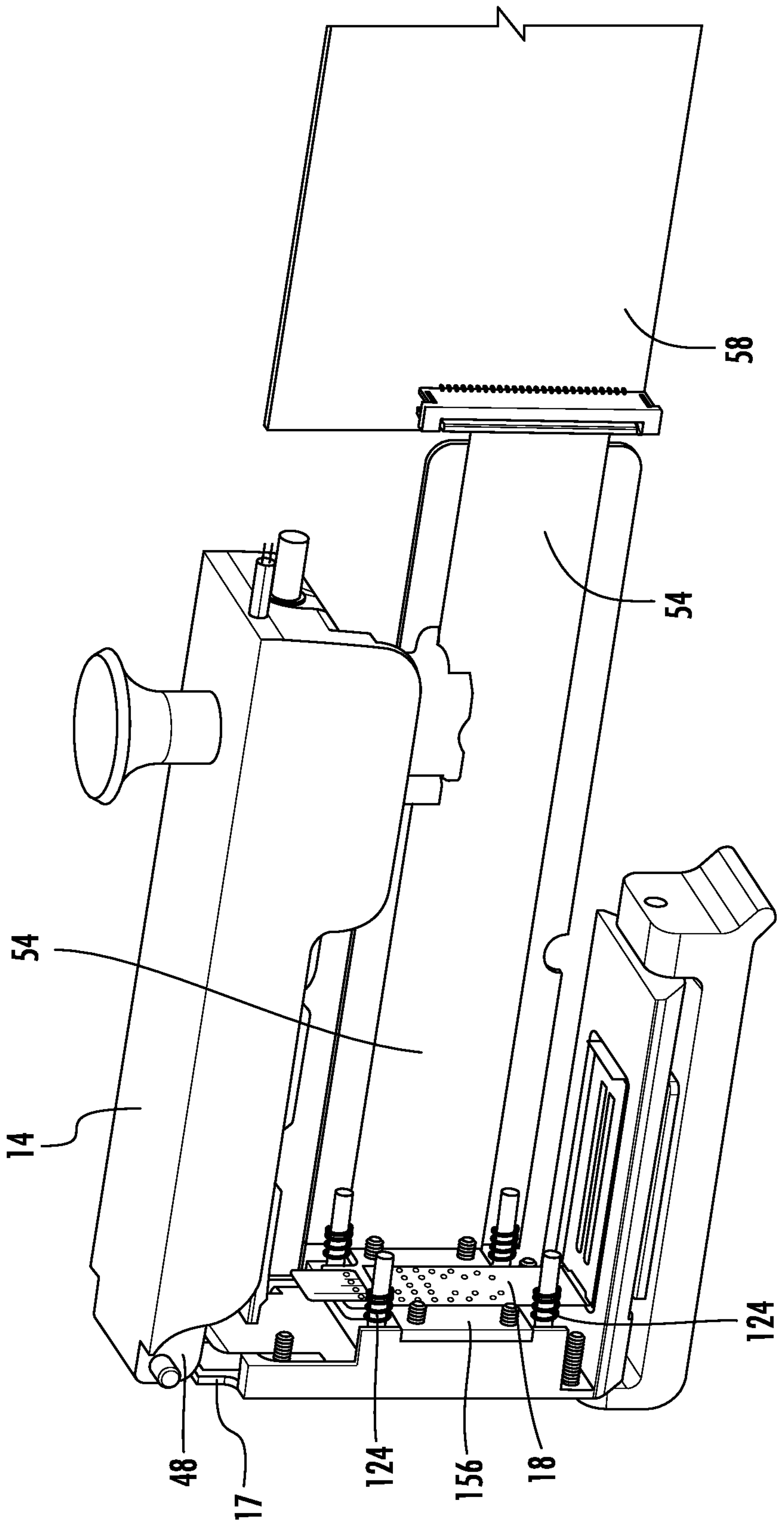
FIG. 15 is a perspective view of the embodiment of FIG. 13 in the closed position with additional elements removed.

FIGS. 10-12 and 19 show the general shapes and configurations of the front plate 16 and circuit board 18 in the depicted embodiment. As noted, two substantially centrally located compressed springs 22 bias the front plate upward against the cam member 46 (see FIG. 10). Four fasteners 20 maintain the circuit board 18 relative to the enclosure and are biased forwardly against the front plate 16. As shown in FIG. 15, the enclosure includes a section with four holes 52 through which the fasteners 20 slidably extend (see FIG. 12). In this embodiment, the lateral springs 24 are located behind the holes 52 (not depicted in FIGS. 10-13). As will be discussed below, embodiments exist with springs that circumscribe the outside of the shanks of the fasteners.

The forward shifting of the circuit board 18 described herein allows a user to insert a cartridge vertically downward into the cartridge receipt cavity, unlike any other print head assemblies on the market that require cartridges to be inserted obliquely and shifted into place. Critically, providing for such vertical installation allows for manufacturing an assembly with a lower profile, which is advantageous to print quality and capabilities. Further, as will be discussed in detail below, a flexible circuit board 54 can be employed to transfer the inner electronics of the print head assembly from the front side to the rear side of the Penstall. Removing the electronics from the front side to the rear side allows for a tighter placement of the ink cartridge to the conveyor system in a printer.

FIGS. 13-18 depict another embodiment of the disclosed print head assembly 110. This embodiment is substantially identical to the embodiment shown in FIGS. 1-12 as reference numeral 10 with exception to two features. First, the lateral bias members 124 comprise compressed springs positioned external to the fasteners 20 that secure the circuit board 18. Additionally, this embodiment also includes a circuit board shield 156 positioned between the circuit board 18 and cartridge cavity. The shield 156 is fixed in place relative to the housing 14 and cavity with the circuit board 18 moveable relative thereto.

All other elements and relationships within the assembly 110 are identical or substantially identical to those within the assembly 10, and thus, all common elements are labeled with like numerals. In operation, the same cam system forces the front plate 16 downward against bias from longitudinal springs 22, which forces the circuit board rearward toward the cavity and cartridge 100, if installed. When the cover 14 is opened, the bottom surface 48 of the cam transitions to the front surface 50, providing clearance for the front plate 16 to move upward via the bias from the springs 22 until the heads of the fasteners 20 align with the dimples 28 and ramp 30 of the front plate. In this opened position, the circuit board 18 is shifted forward and withdrawn from the shield 156 away from the cavity and cartridge 100, thus disengaging the circuit board 18 from the cartridge 100.

Figure 16:
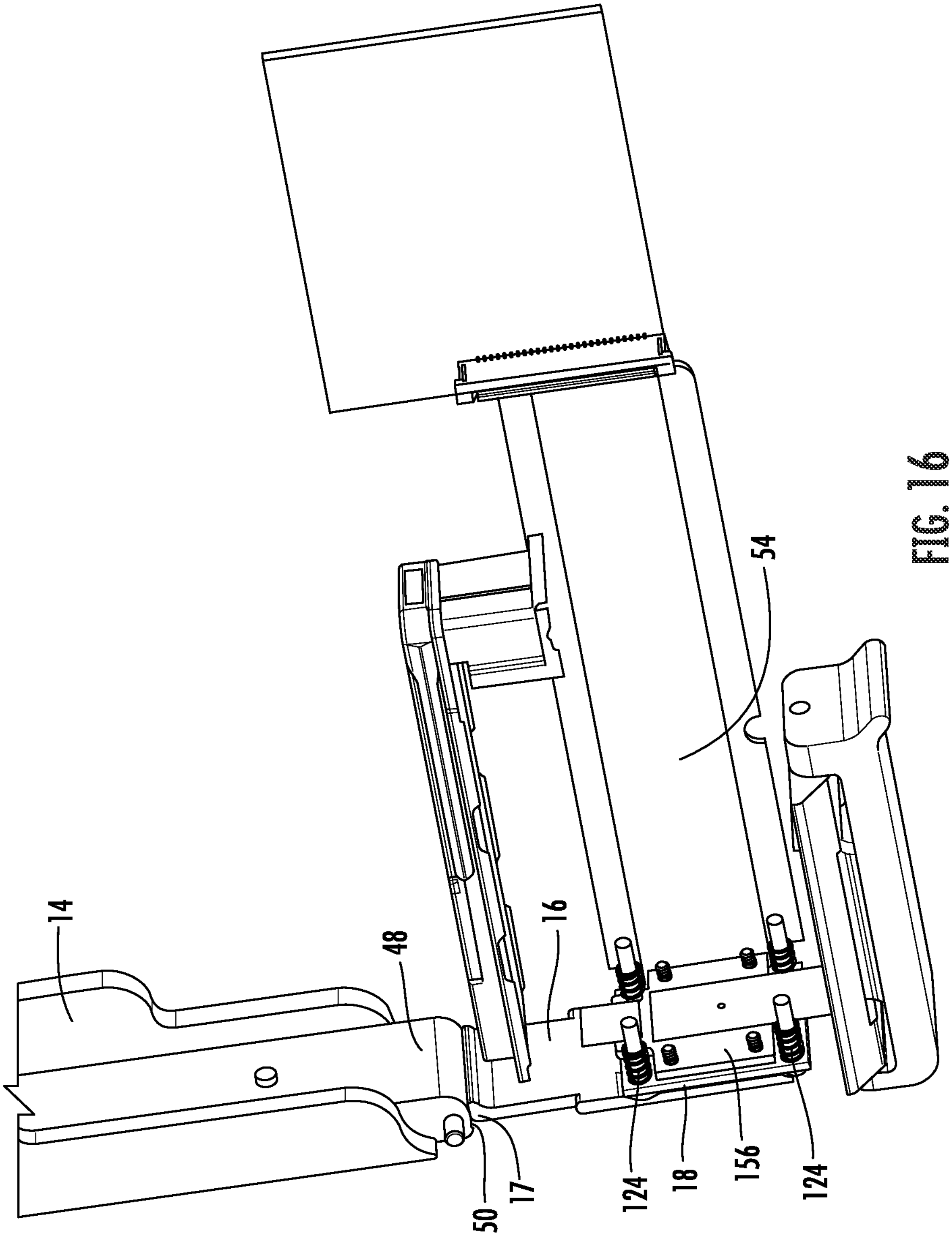
FIG. 16 is a perspective view of the embodiment of FIG. 13 in the opened position.
Figure 17:
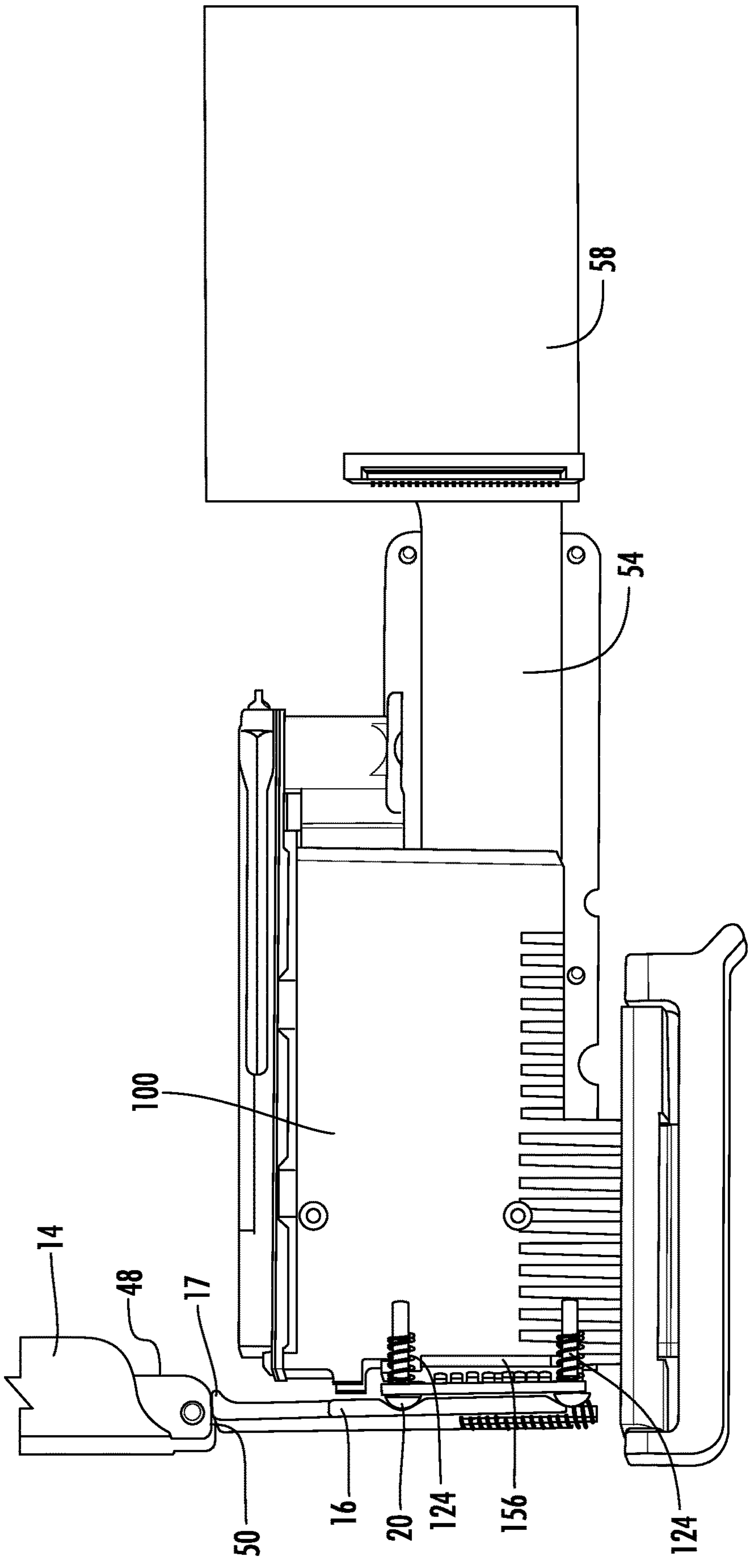
FIG. 17 is a side elevation view of the embodiment of FIG. 13 with certain elements removed.

As shown most clearly in FIGS. 15 and 16, this embodiment of the shield 156 has a plate-like form with a central opening sized and shaped to accommodate the circuit board 18 when it is pushed rearward toward the cavity in the closed position (FIG. 15). The shield 156 may be opened on the bottom, as shown, however this is not a limiting characteristic of the inventive embodiments. Since the shield 156 is fixed relative to the housing and cavity, when the assembly is in the opened position, the shield provides a physical barrier between the cavity and circuit board 18, protecting the circuit board from inadvertent contact with a cartridge during removal and/or installation. In the closed position of the assembly 110, the circuit board is forced rearward into the opening defined by the shield 156 and into a lateral position relative to the cartridge 100 to effect communicative contact therebetween through the shield opening.

Figure 18:
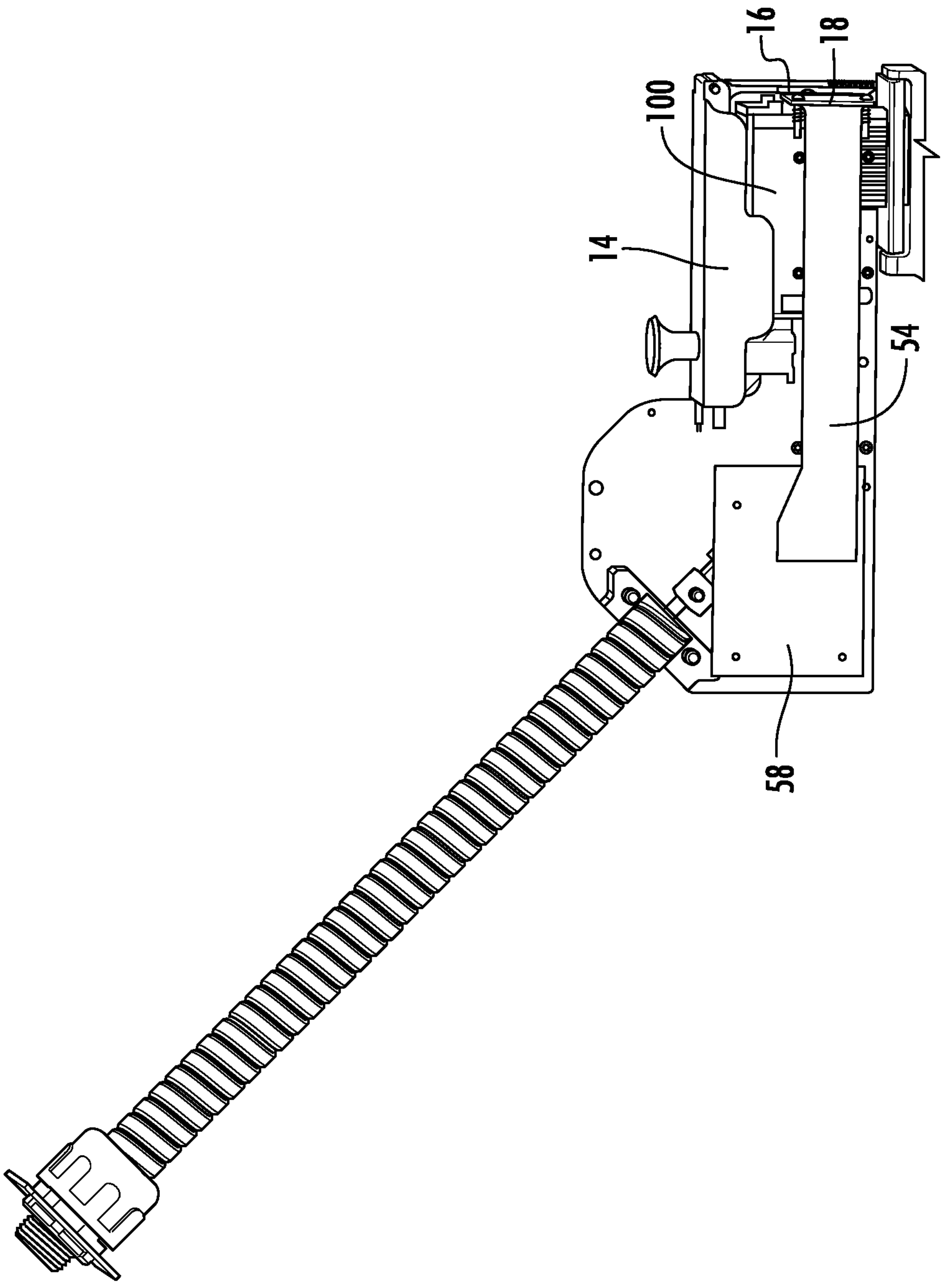
FIG. 18 is a side elevation view of the embodiment of FIG. 13 with certain elements removed from the opposite side from FIG. 17.

While the flexible circuit 54 or portions thereof are shown in numerous Figures, it is best understood with reference to FIGS. 15 and 18. As shown, the flexible circuit communicatively attaches to the circuit board 18 on a front side and to a main inner circuit board 58 on a rear side. In this manner, the main circuit board 58 can be positioned in a rear section of the Penstall removed from the moving parts of the print head and rear of the cavity and cartridge 100. This shifting of the inner location of the main circuit board 58 for processing data in this manner allows design of a smaller and lower profile print head.

The remaining elements and operational characteristics of the embodiment of the assembly 110 are the same as detailed above with respect to the assembly 10. Such elements and characteristics, without limitation, include the housing 12, cover 14, front plate 16, circuit board 18, longitudinal springs 22 and a cam system 46 including bottom surface 48 and side surface 50, which are thus not described in detail with respect to FIGS. 13-18, but are readily understood by those skilled in the art. Additionally, the embodiments of FIGS. 1-12 and 13-18 are not limited in terms of the exact combination of elements. That is, embodiments exist with lateral springs 24 rear of the fasteners 20, but which also includes a circuit board shield 156. Likewise, embodiments exist with external springs 124 and without a circuit board shield 156.

Further, while the disclosed embodiments of the assembly with dynamically shifting circuit board utilize sets of compressed lateral springs and compressed longitudinal springs cooperatively acting on the front plate, other embodiments exist that employ different mechanisms. Such mechanisms include, without limitation, cooperative lever between cover and front plate and/or circuit board, torsion springs acting on the front plate and/or circuit board, compressed resilient material acting on the front plate and/or circuit board, and extended torsion springs acting on the front plate and/or circuit board. Still further embodiments exists wherein forward movement of the circuit board is initiated by another mechanism not linked automatically to the cover, such as a manual release latch, switch or button actuatable by human action to release the circuit board prior to removing and replacing an ink cartridge.

Additional elements, characteristics and features of the depicted embodiments of the print head assembly 10 and 110 include, without limitation:

One piece main Penstall design.

Low profile design allows for placement 0.5 inches above conveyor system in printer.

Assembly allows for vertical and horizontal printing.

Includes a single conduit for all incoming data, power and ink lines.

Data is transferred via Mini Display Port cable.

Internally mounted main PCB 58 processes all incoming data and power and communicates with the circuit board 18 in the printhead via flexible PCB 54.

Printhead cartridge is easily removable for cleaning and replacement without risk of unnecessary contact with circuit board and resulting damage.

While a particular embodiment of a print head assembly with dynamically shifting circuit board cam system with cooperative spring biased front plate 16 and circuit board 18 is described herein, those skilled in the art would readily understand that alternate options exist for providing such dynamic shifting upon opening the cover via a cam system. Such reasonable alternatives include, without limitation, different types or quantities of bias members, different numbers or positions of circuit board fasteners, and different configurations of dimples/ramps in the front plate. Further, the general characteristics of the disclosed cam/front plate/circuit board/spring system is clearly usable in different types of print head assemblies other than for use with thermal ink jet printing and/or non-Penstall design.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A print head assembly, comprising:

a housing defining an inner cavity configured for receipt and retention of a print ink cartridge;

a cover for operatively opening and closing an access opening in the housing that communicates with the cavity; and a movable circuit board configured and positioned for communicating with a print ink cartridge installed within the cavity, wherein opening of the cover to an opened position initiates movement of the circuit board away from the cavity and disengagement from a print ink cartridge installed within the cavity and closing of the cover to a closed position initiates movement of the circuit board toward the cavity and engagement with a print ink cartridge installed within the cavity.

2. The assembly of claim 1, comprising a circuit board shield defining an opening through which the circuit board is accessible for communication with an ink cartridge installed within the cavity when the cover is in the closed position.

3. The assembly of claim 1, comprising at least one lateral bias member biasing the circuit board away from the cavity.

4. The assembly of claim 3, wherein the circuit board is biased against a plate positioned forward of the circuit board.

5. The assembly of claim 4, comprising at least one longitudinal bias member biasing the plate in a direction toward the cover.

6. The assembly of claim 5, comprising an irregularly shaped cam member engaged with the front plate, wherein the cam member holds the front plate in a respective position against biasing force from the at least one longitudinal bias member.

7. The assembly of claim 5, wherein the plate defines an irregularly contoured front surface in operative engagement with the circuit board.

8. The assembly of claim 1, wherein the cover is in operative communication with a plate positioned forward of the circuit board for initiating or allowing movement of the circuit board away from the cavity when the cover is in the opened position.

9. The assembly of claim 1, comprising a flexible circuit with a front portion communicatively engaged with the circuit board and extending rearward therefrom to a rear portion communicatively engaged with an inner main printed circuit board (PCB), thereby providing a communicative pathway between the circuit board and the main PCB.

10. The assembly of claim 9, wherein the main PCB is positioned rear of the cavity.

11. The assembly of claim 1, wherein the circuit board is movable via one or more of compressed helical springs, a cooperative lever assembly engaged with the cover, bias from torsion springs, bias from compressed resilient material and extended helical springs.

12. The assembly of claim 1, wherein movement of the circuit board is operable via a plate positioned forward of the circuit board that reciprocates upward and downward in response to the cover being opened and closed, respectively.

13. A print head assembly, comprising:

a housing defining an inner cavity configured for receipt and retention of a print ink cartridge;

a cover configured to open and close an access opening in the housing that provides access to the inner cavity; and a circuit board positioned within the housing extending in a first direction from a top edge to a bottom edge, wherein the circuit board is movable back-and-forth repeatedly in forward and rearward directions perpendicular to the first direction between a first position toward the inner cavity and a second position away from the inner cavity.

14. The print head assembly of claim 13, wherein the circuit board is biased forward toward the second position.

15. The print head assembly of claim 14, comprising a plate positioned forward of the circuit board and providing a stop against the bias in the second direction.

16. The print head assembly of claim 15, wherein the plate is movable between a first longitudinal position that holds the circuit board in the first position and a second longitudinal position that provides a clearance to allow the circuit board to move into the second position.

17. A print head assembly, comprising:

a housing defining an inner cavity configured for receipt and retention of a print ink cartridge;

a cover for operatively opening and closing an access opening in the housing that communicates with the cavity;

a circuit board positioned forward of the cavity and configured for communicative contact with a print ink cartridge installed within the cavity;

a circuit board shield positioned forward of the cavity and defining a shield opening;

a plate positioned forward of the circuit board, wherein the plate is operatively connected to the cover whereby when the cover is in a closed position closing the access opening, the plate forces the circuit board into the shield opening, and when the cover is in an opened position allowing access to the access opening, the plate allows the circuit board to move forward withdrawing from the shield opening such that the shield is positioned between the cavity and the circuit board.

18. The assembly of claim 17, wherein the plate defines a front surface with at least one relief dimple and a flat section, and the circuit board is maintained within the housing by at least one fastener having a head on a forward side of the circuit board, wherein the head of one of the at least one fastener is aligned with one of the at least one dimple when the cover is in the opened position and the head of said one of the at least one fastener is aligned with a flat section when the cover is in the closed position.

19. The assembly of claim 17, wherein the circuit board is under a biasing force in a first direction and the plate is under a biasing force in a second direction substantially perpendicular to the first direction.

20. The assembly of claim 17, comprising an irregularly shaped cam member operatively engaged with the plate, wherein the plate is biased in an upward direction, and the cam member causes the plate to move downward against the upward bias when the cover is in the closed position, and the cam member permits the plate to move upward via the upward bias when the cover is in the opened position.

* * * * *